United States Patent
Lau et al.

(10) Patent No.: US 10,306,535 B2
(45) Date of Patent: May 28, 2019

(54) SOFT LOCK OF A CELL IN A WIRELESS NETWORK

(71) Applicant: Telefonaktiebolaget LM Ericsson (publ), Stockholm (SE)

(72) Inventors: Scholastica Lau, Nepean (CA); Michael Petras, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 159 days.

(21) Appl. No.: 15/504,043

(22) PCT Filed: Aug. 25, 2014

(86) PCT No.: PCT/IB2014/064050
§ 371 (c)(1),
(2) Date: Feb. 15, 2017

(87) PCT Pub. No.: WO2016/030716
PCT Pub. Date: Mar. 3, 2016

(65) Prior Publication Data
US 2017/0280369 A1    Sep. 28, 2017

(51) Int. Cl.
*H04W 48/02* (2009.01)
*H04W 76/34* (2018.01)
(Continued)

(52) U.S. Cl.
CPC .......... *H04W 48/02* (2013.01); *H04W 36/08* (2013.01); *H04W 36/165* (2013.01);
(Continued)

(58) Field of Classification Search
CPC combination set(s) only.
See application file for complete search history.

(56) References Cited

U.S. PATENT DOCUMENTS

| 7,457,248 B1 | 11/2008 | Ali et al. | |
| 2004/0236547 A1* | 11/2004 | Rappaport | G06F 17/509 |
| | | | 703/2 |

(Continued)

FOREIGN PATENT DOCUMENTS

| EP | 1 001 555 A2 | 5/2000 |
| WO | 2011 136704 | 11/2011 |
| WO | 2013 184052 | 12/2013 |

OTHER PUBLICATIONS

Alcatel-Lucent, "Alcatel-Lucent 9400 LTE Radio Access Network—FDD Feature Planning Guide", Jul. 2014, Alcatel-Lucent, Release LR14.1.L/9YZ-04152-0005-FMZZA/Issue 0.07 (Year: 2014).*

(Continued)

*Primary Examiner* — Paul H Masur
*Assistant Examiner* — Michael K Phillips
(74) *Attorney, Agent, or Firm* — Sage Patent Group (57) ABSTRACT

In some embodiments, a method comprises blocking mobile devices from establishing new connections to a cell, ending existent connections of mobile devices to the cell gradually based on a shutdown procedure, and locking the cell after the shutdown procedure. The shutdown procedure is configured according to pre-defined parameters that indicate to end the existent connections based on at least one of a priority level of existent connections or an activity level of existent connections.

22 Claims, 9 Drawing Sheets

(51) Int. Cl.
*H04W 36/16* (2009.01)
*H04W 36/08* (2009.01)
*H04W 36/22* (2009.01)
*H04W 36/24* (2009.01)
*H04W 36/38* (2009.01)
*H04W 28/16* (2009.01)

(52) U.S. Cl.
CPC ........... *H04W 36/22* (2013.01); *H04W 36/24* (2013.01); *H04W 36/38* (2013.01); *H04W 76/34* (2018.02); *H04W 28/16* (2013.01)

(56) References Cited

U.S. PATENT DOCUMENTS

| | | | | |
|---|---|---|---|---|
| 2010/0144363 | A1* | 6/2010 | De Rosa | H04W 72/0486 455/452.1 |
| 2011/0096687 | A1* | 4/2011 | Dottling | H04W 24/02 370/252 |
| 2011/0177820 | A1* | 7/2011 | Westroos | H04W 76/18 455/438 |
| 2011/0255516 | A1* | 10/2011 | Pawar | H04W 36/14 370/332 |
| 2012/0244869 | A1* | 9/2012 | Song | H04W 52/0206 455/449 |
| 2012/0281566 | A1* | 11/2012 | Pelletier | H04W 76/27 370/252 |
| 2013/0040683 | A1* | 2/2013 | Siomina | H04W 28/0236 455/517 |
| 2014/0036690 | A1 | 2/2014 | Berg et al. | |
| 2015/0009877 | A1* | 1/2015 | Chiang | H04W 52/0206 370/311 |
| 2016/0255580 | A1* | 9/2016 | Onaka | H04W 48/00 370/311 |

OTHER PUBLICATIONS

3GPP, "3rd Generation Partnership Project; Technical Specification Group Radio Access Network; User Equipment (UE) procedures in idle mode and procedures for cell reslection in connected mode (Release 7)", Dec. 2006, 3GPP, 3GPP TS 25.304, v7.1.0 (Year: 2006).*
Suleiman, Interactions Study of Self Optimizing Schemes in LTE Femtocell Networks, Dec. 2012, Queen's University Kingston Ontario Canada (Year: 2012).*
International Search Report for International application No. PCT/IB2014/064050—Sep. 11, 2015.
Information Technology—Open Systems Interconnection—Systems Management: State Management Function; ITU-T Standard, International Telecommunication Union, Geneva; CH, No. X.731—Jan. 17, 1992.

* cited by examiner

SOFT LOCK OF A CELL IN A WIRELESS NETWORK

PRIORITY

This nonprovisional application is a U.S. National Stage Filing under 35 U.S.C. § 371 of International Patent Application Serial No. PCT/IB2014/064050 filed Aug. 25, 2014, and entitled "Soft Lock Of A Cell In A Wireless Network".

TECHNICAL FIELD

The present disclosure relates, in general, to wireless communications and, more particularly, to soft lock of a cell in a wireless network.

BACKGROUND

A wireless network is generally made up of a number of cells. Each cell can connect mobile phones and other mobile devices to the network via wireless signaling. In some situations, a network operator may temporarily or permanently take a cell out of operation, for example, to repair, replace, upgrade, maintain, or decommission the hardware or software components associated with the cell. A basic cell locking procedure can be used to take the cell out of operation. In the basic cell locking procedure, all the cell resources are immediately released and all of the existing traffic on the cell drops. Unfortunately, dropping the existing traffic causes undesirable service impacts on the users.

SUMMARY

Disclosed is a soft locking method for gracefully taking a cell out of operation. In some embodiments, a method comprises blocking mobile devices from establishing new connections to a cell, ending existent connections of mobile devices to the cell gradually based on a shutdown procedure, and locking the cell after the shutdown procedure. The shutdown procedure is configured according to pre-defined parameters that indicate to end the existent connections based on at least one of a priority level of existent connections or an activity level of existent connections. In some embodiments, the pre-defined parameters include timers configured to implement the shutdown procedure in multiple stages.

In some embodiments, the shutdown procedure determines the priority level of existent connections and uses using the priority level to select a first subset of existent connections to receive assistance in moving to another cell. The priority level may be determined based on allocation retention priority (ARP) information, service type, subscription level information associated with the existent connections, and/or other suitable criteria. The shutdown procedure selects a target cell for a first existent connection of the first subset of existent connections and assists in moving the first existent connection to the selected target cell. Examples of such assistance include forced handover and release with redirect (RWR).

In some embodiments, the shutdown procedure uses the priority level to select a second subset of existent connections to receive assistance in moving to another cell. The shutdown procedure waits to assist in moving the second subset of existent connections or proceeds with assisting in moving the second subset of existent connections depending on whether a threshold number of the first subset of existent connections remain in the cell. In some embodiments, the shutdown procedure releases a subset of lowest priority level existent connections without assisting the lowest priority level existent connections in moving to another cell.

In some embodiments, the shutdown procedure uses a load balancing procedure when assisting in moving existent connections. The load balancing procedure matches an existent connection to a respective one or more of a plurality of target cells based on at least one of service used, application used, recent history of data volume used by the connection, channel quality, subscribed quality of service, power measurement, and current load on the target cells.

In some embodiments, the step of ending the existent connections of mobile devices to the cell includes decreasing an inactivity timer value associated with the cell, monitoring the existent connections of the mobile devices for periods of inactivity, and releasing the existent connections for which the period of inactivity exceeds the inactivity timer value. In some embodiments, the method ends the existent connections based on the periods of inactivity prior to the expiry of a first shutdown timer and begins assisting in moving the existent connections to one or more target cells after the expiry of the first shutdown timer.

In some embodiments, the shutdown procedure determines that a first mobile device is capable of downlink coordinated multipoint operation, uplink coordinated multipoint operation, or carrier aggregation. The shutdown procedure instructs the first mobile device to use one or more of the downlink coordinated multipoint operation, the uplink coordinated multipoint operation, and the carrier aggregation when moving the first mobile device's existent connection to a target cell.

In some embodiments, the method further comprises early-locking the cell if all of the existent connections of the mobile devices to the cell ended prior to the end of a shutdown time period. If, however, existent connections remain after the expiry of a maximum shutdown period timer, the method releases all remaining existent connections.

In some embodiments, the shutdown procedure further comprises gradually reducing power of the cell.

In some embodiments, the step of blocking the mobile devices from establishing the new connections to the cell comprises sending a broadcast message indicating that the cell is barred. In addition, or in the alternative, the step of blocking the mobile device comprises receiving a handover request and, in response, sending a rejection indicating that the cell is barred.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

A network operator uses a locking mechanism to take a cell out of operation. Prior locking mechanisms lock the cell by dropping all existing traffic on the cell, which negatively impacts service. Embodiments of the present disclosure relate to a soft locking mechanism for the graceful shutdown of a cell. A goal of the soft locking mechanism is to move traffic out of the cell before entering lock state. Moving the traffic out of the cell provides a means to reduce or eliminate the service impact when taking a cell out of operation.

Figure 1:
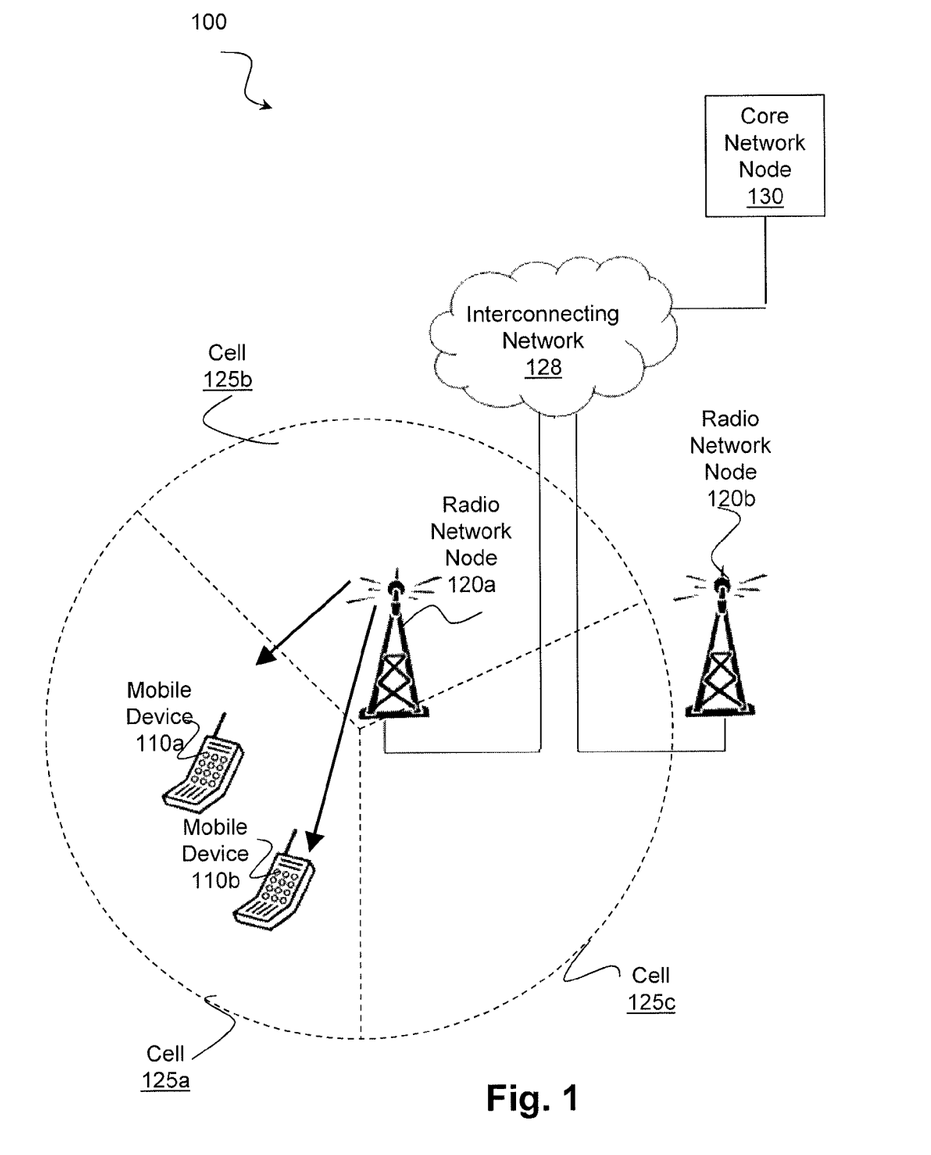
FIG. 1 illustrates a block diagram of an example of a wireless network according to one embodiment of the present disclosure.

FIG. 1 illustrates a block diagram of an example of a wireless network 100 according to one embodiment of the present disclosure. Wireless network 100 includes one or more mobile devices 110 and a plurality of network nodes. The network nodes include radio access nodes 120 (such as a base station or eNodeB) and core network nodes 130. A radio network node 120 may be configured with one or more transmitters that provide wireless signal coverage within one or more geographical areas referred to as cells 125. The geographical area covered by one cell 125 may overlap the geographical area covered by another cell 125. For example, two cells 125 operating at different radio frequencies may provide coverage to roughly the same geographical area. As used herein, shutting down a cell 125 may refer to shutting down the transmitters and/or other components that provide coverage within cell 125.

In FIG. 1, mobile device 110a within cell 125a communicates with radio network node 120a over a wireless interface. Mobile device 110a transmits wireless signals to radio network node 120a and/or receives wireless signals from radio network node 120a. The wireless signals contain voice traffic, data traffic, and control signals, for example. Core network node 130 manages various functionality for mobile device 110, such as the establishment of communication sessions. As used herein, sessions may interchangeably be referred to as connections. The network nodes connect through interconnecting network 128, which refers to any interconnecting system capable of transmitting audio, video, signals, data, messages, or any combination of the preceding. Examples of mobile device 110, radio network node 120, and core network node 130 are described with respect to FIGS. 4, 5, and 6, respectively.

Figure 2:
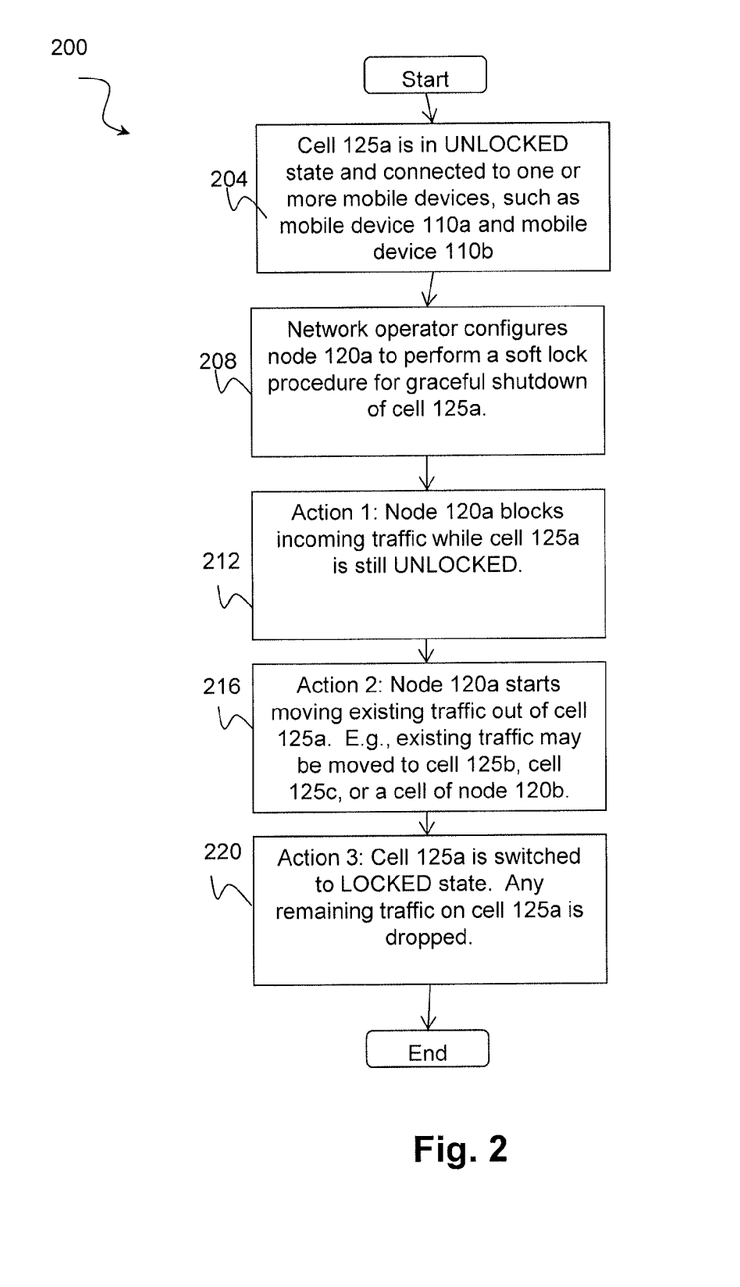
FIG. 2 shows a flow diagram of a method for soft lock of a cell in a wireless network according to one embodiment of the present disclosure.

FIG. 2 shows a flow diagram of a method 200 for soft lock of a cell 125a in wireless network 100 according to one embodiment of the present disclosure. Method 200 begins at step 204 where cell 125a is in an unlocked state. In the unlocked state, cell 125a can accept incoming connections and maintain existing connections with mobile devices 110. At step 208, a network operator configures radio network node 120a to perform a soft lock procedure for graceful shutdown of cell 125a. In some embodiments, the network operator manually configures radio network node 120a to perform the soft lock procedure by changing a parameter setting associated with cell 125a. As an example, the network operator could configure the administrative state SHUTTING_DOWN for a cell of an LTE eNodeB. At step 212, radio network node 120a blocks incoming traffic while cell 125a is still in UNLOCKED state. In some embodiments, radio network node 120a configures a broadcast message to indicate that cell 125a is barred from accepting incoming traffic. For example, in an LTE network, radio network node 120a may configure system information block type 1 (SIB1) messages to indicate that cell 125a is barred from accepting incoming traffic. In addition, or in the alternative, radio network node 120a may reject handover requests and/or call admission requests in order to block incoming traffic. At step 216, radio network node 120a starts moving existing traffic out of cell 125a. In some embodiments, radio network node 120a assists in moving the existing traffic by providing handover or release with redirect (RWR) information to mobile devices 110. The information assists mobile device 110 in locating one or more neighboring cells for connection, such as cell 125b, cell 125c, or a cell 125 of radio network node 120b. At step 220, radio network node 120a switches cell 125a to LOCKED state and any remaining traffic on cell 125a is dropped.

Figure 3:
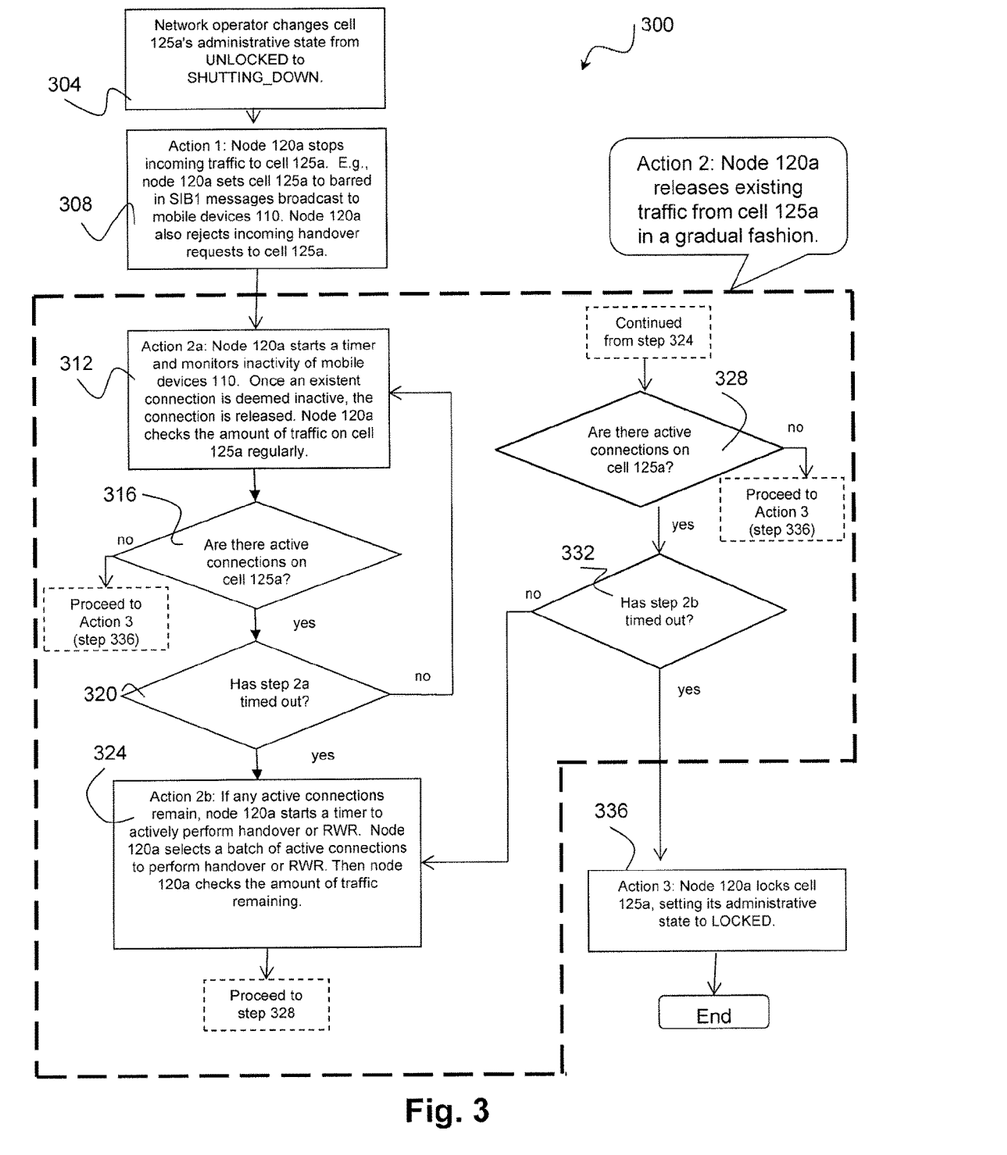
FIG. 3 shows a flow diagram of a method for soft lock of a cell in a wireless network according to one embodiment of the present disclosure.

FIG. 3 shows a flow diagram of a method 300 for soft lock of a cell 125a in a wireless network 100 according to one embodiment of the present disclosure. Radio network node 120a supports configuring an administrative state on each of its cells 125a, 125b, and 125c. At a given time, cells 125a-c can be configured with the same administrative state (e.g., all unlocked) or different administrative states (e.g., one cell could be unlocked, another cell could be locked, and yet another cell could be shutting down). Thus, the soft lock operation on a cell 125 can be performed individually or can be used in coordination among cells for operations at the node 120 level. Also, the high level steps described in performing the soft lock operation could apply to other areas besides a cell. The same concept can be applied to a specific carrier, sector, equipment, or device. There are different contexts in which a soft lock operation can be used, including maintenance activity, software upgrade, or energy savings due to graceful shutdown of low usage equipment.

At step 304, the network operator can configure to move one or multiple cells 125 from an unlocked state to a shutting down state. In response to the configuration change, node 120a performs a soft lock to gracefully shutdown the selected cell(s). The following example describes a soft lock of cell 125a. In general, the example includes three actions. In Action 1, node 120a stops incoming traffic to cell 125a. Step 308 below describes an example embodiment of Action 1. In Action 2, node 120a releases traffic from cell 125a in a gradual fashion. Steps 312 through 332 below describe an example embodiment of Action 2. In Action 3, node 120 locks cell 125a. Step 336 below describes an example embodiment of Action 3.

With respect to step 308, node 120a blocks incoming traffic from entering cell 125a. In some embodiments, this is done by setting cell 125a to barred and broadcasting a message to mobile devices 110 that indicates cell 125a is barred. As an example, radio network node 120a broadcasts a SIB1 message to inform mobile devices 110 that cell 125a is barred. The broadcast prevents existing sessions/connections of mobile devices 110 from re-camping on cell 125a. Radio network node 120a also stops accepting incoming handover requests.

At step 312, radio network node 120a starts moving existing traffic out of cell 125a. Radio network node 120a monitors session inactivity and releases sessions as they become inactive. An inactivity timer may be set to the shortest duration possible that releases the sessions both quickly and gracefully. As an example, the inactivity timer could be set to a value within the range of approximately 5 seconds to 20 seconds, such as 10 seconds.

At step 316, radio network node 120a periodically checks for any active connections on cell 125a. If there are no active connections, the method skips to step 336 and locks cell 125a. If there are some remaining active connections, the method proceeds to step 320 to determine if a first shutdown timer has expired. The first shutdown timer indicates the amount of time to wait for sessions to be ended according to inactivity. The first shutdown timer may be set to any suitable value, such as a value within the range of approximately 10 seconds to 5 minutes. In some embodiments, the first shutdown timer is set to a value that uses ⅔ of the soft lock duration. Thus, if the soft lock duration is set to 90 seconds, the first shutdown timer would be set to 60 seconds. If at step 320 the first shutdown timer has not expired, the method returns to step 312 where radio network node 120 continues to end sessions according to inactivity. If at step 320 the first shutdown timer has expired, the method proceeds to step 324.

At step 324, radio network node 120a starts a second shutdown timer. The second timer can be set to any suitable value, such as a value in the range of approximately 10 seconds to 5 minutes. In some embodiments the second shutdown timer is set to a value that uses ⅓ of the soft lock duration. Thus, if the soft lock duration is set to 90 seconds, the second shutdown timer would be set to 30 seconds. After expiry of the first shutdown timer and prior to expiry of the second shutdown timer, radio network node 120a may optionally continue to release connections based on session inactivity.

In addition, radio network node 120a assists moving mobile devices 110 to other cells 125 after expiry of the first shutdown timer and prior to expiry of the second shutdown timer. For example, radio network node 120a actively performs handover and/or RWR to move sessions from cell 125a and assist mobile devices 110 in finding another cell 125. Radio network node 125a can perform handover or RWR in batches. The batches may be prioritized and handover or RWR can be performed first for higher priority sessions and then for lower priority sessions. For example, voice traffic may be given higher priority than data traffic. As another example, subscriptions with a high QOS requirement may be given higher priority than subscriptions with a low QOS requirement. Performing the handover or RWR in batches allows traffic to be moved gradually and avoids overload.

At step 328, radio network node 120a periodically checks to see if there are any active connections remaining on cell 125a. If no active connections remain, the method skips to step 336 to lock cell 125a. If there are active connections remaining, the method proceeds to step 332 to check for the expiry of the second shutdown timer. If the second shutdown timer has not expired, the method returns to step 324 to continue moving connections out of cell 125a using handover and/or RWR. If at step 332 the second shutdown timer has expired, the method proceeds to step 336.

At step 336, radio network node 120a changes the cell to LOCKED state. This step is performed when all existing traffic has been moved or when the soft lock duration has elapsed. Thus, the outcome to move all traffic out of the cell 125a can be achieved within an acceptable duration of time. Such duration depends on the capacity of the cell and the amount of traffic on the cell during the soft-lock operation.

However a maximum timeout (soft lock duration) should be predefined for the whole operation. In the example, the soft lock duration is equal to the value of the first shutdown timer (e.g., 60 seconds) plus the value of the second shutdown timer (e.g., 30 seconds). Any remaining traffic is dropped at step 336. However, prior to the locking of cell 125a at step 336, radio network node 120a may check to see if any of the active sessions on cell 125a are using emergency service, such as E911 services. If so, radio network node 120a may wait to lock cell 125a until the emergency call has moved to another cell or ended on its own.

Note that although the preceding example starts the second timer after the expiry of the first timer, in other embodiments, the timers can start at the same time and the second shutdown timer could measure the full soft lock duration (e.g., 90 seconds in the preceding example). Thus, in this alternative embodiment, the expiry of the first timer triggers radio network node 120a to begin actively moving connections out of the cell and the expiry of the second timer triggers radio network node 120a to lock the cell.

The overall solution described with respect to FIG. 3 separates Action 1 (block new connections, step 308) and Action 2 (end/move existent connections out of the cell, steps 312-332) to allow coordination among the cells 125. For example, should all cells 125a-125c on radio network node 120a be soft-locked at the same time, performing Action 1 to block new connections will prevent traffic from moving from one cell to another cell that is also in the process of soft locking.

Although the preceding example describes certain techniques for gradually moving traffic out of cell 125a in Action 2, other techniques could be used in addition to or in the alternative to the described techniques. Example options for gradually moving traffic are set forth below. One or multiple of these options can be used simultaneously (e.g., in parallel and/or sequentially as a part of Action 2).

Option 1: Node 120 monitors session inactivity and releases existing connections in the normal fashion as they become inactive. In some embodiments, node 120 configures the inactivity timer value to its minimum value to facilitate releasing existing connections as quickly as possible.

Option 2: Node 120 uses measurement reports from mobile devices 110 to determine the probability that another cell 125 can handle the connection. If the measurement reports indicate that another cell 125 can handle the connection for a particular mobile device 110, node 120 initiates the appropriate handover for that mobile device 110. Handover may be initiated to any one of intra-frequency, inter-frequency, inter-band, or inter-radio access technology (such as from LTE to WiFi).

Option 3: Node 120 gradually reduces the power of the cell 125 being locked. This creates a condition that triggers mobile devices 110 to move out of the cell 125 being locked in favor of another, higher power cell 125 that provides a stronger signal. In some embodiments, the gradual reduction of power could be combined with Actions 2A and 2B of FIG. 3. The gradual reduction of power could be performed in parallel with Action 2A and/or Action 2B, or the gradual reduction of power could be performed after Action 2B.

Option 4: Node 120 encourages mobile devices capable of advanced features, such as CoMP (Co-ordinated Multi-Point) and CA (Carrier Aggregation), to use the advanced features. These features offer the connection a secondary transmission or reception point at the sector or carrier level on a different cell. This secondary channel could be used for the purpose of transition during cell soft lock and/or as a target cell to move to.

Option 5: Node 120 facilitates handover of mobile devices 110 to another cell. In some embodiments, node 120 prioritizes the mobile devices 110 and facilitates the handovers for higher priority mobile devices 110 first. After facilitating the handovers for the higher priority mobile devices 110, node 120 may then facilitate handovers for the lower priority mobile devices 110, for example, if node 120 has sufficient resources to do so in the time remaining before the cell is locked. Mobile devices 110 may be prioritized according to any suitable criteria, such as service type (e.g., voice or data service), subscribed QOS level, ARP (Allocation and Retention Priority), and/or other criteria. The handovers that node 120 facilitates may be blind handovers and/or handovers where the node 120 uses measurements from mobile device 110 to select the target cell.

Option 6: Node 120 performs release with redirect (RWR). In some embodiments, node 120 prioritizes the mobile devices 110 and facilitates RWR for higher priority mobile devices 110 first. After facilitating the RWR for the higher priority mobile devices 110, node 120 may then facilitate RWR for the lower priority mobile devices 110, for example, if node 120 has sufficient resources to do so in the time remaining before the cell is locked. Mobile devices 110 may be prioritized according to any suitable criteria, such as service type (e.g., voice or data service), subscribed QOS level, ARP (Allocation and Retention Priority), and/or other criteria.

Option 7: Node 120 Releases the connection and lets mobile devices 110 re-establish the connection on another cell without assistance from node 120. This option may be acceptable on low priority or inactive connections.

There are a number of considerations which Action 2 should incorporate when possible. A solution can use a flexible weight factor on each of these considerations to prioritize the way they are to be used in the operation.

Consideration 1: Careful termination of emergency calls. They should be given highest priority to be gracefully released.

Consideration 2: Prioritize the order of releases. Handle high priority traffic first, such as those carrying voice. Prioritization can be based on ARP (Allocation and Retention Priority) of the connections, service type, QOS, or other suitable criteria.

Consideration 3: Balance the load over all the cells that can pick up traffic, matching connection to another cell depending on services and applications used, CQI (QOS), recent history of data volume, measurements, etc.

Consideration 4: Handling of advanced features like Downlink (DL) CoMP/Uplink (UL) CoMP and CA. If the primary sector or carrier connection is to be released, proper deactivation or reconfiguration of the feature capability on the connection may be required.

Consideration 5: The process should be performed in a gradual fashion to avoid overload.

Consideration 6: The process should complete within an acceptable duration of time. Such duration depends on the capacity of the cell and the amount of traffic on the cell during the soft-lock operation. However a maximum timeout should be predefined for the whole operation.

The described method in Action 2, incorporating the options and considerations, may allow existing connections to move out of the cell before the cell is locked, with minimum impacts to their services during the process.

Figure 4:
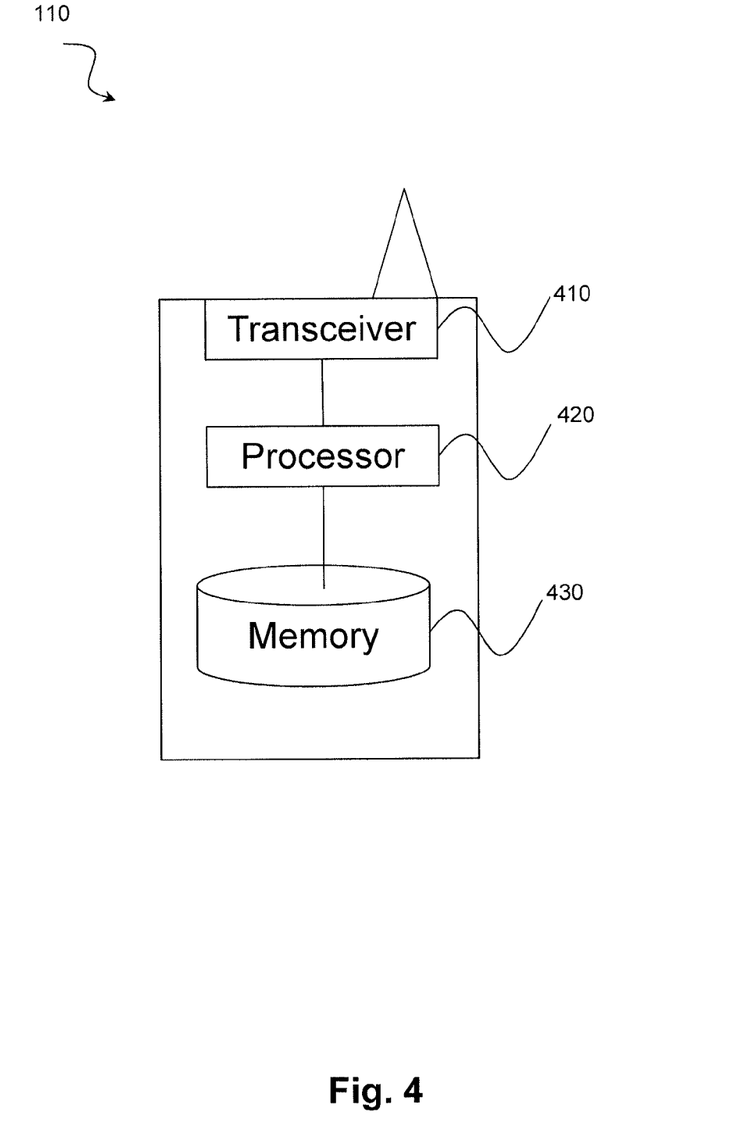
FIG. 4 illustrates a block diagram of a mobile device according to one embodiment of the present disclosure.

FIG. 4 illustrates a block schematic of a mobile device 110 according to one embodiment of the present disclosure. Examples of mobile device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Mobile device 110 includes transceiver 410, processor 420, and memory 430. In some embodiments, transceiver 410 facilitates transmitting wireless signals to and receiving wireless signals from radio network node 120 (e.g., via an antenna), processor 420 executes instructions to provide some or all of the functionality described herein as provided by a mobile device 110, and memory 430 stores the instructions executed by processor 420.

Processor 420 includes any suitable combination of hardware and software implemented in one or more integrated circuits or modules to execute instructions and manipulate data to perform some or all of the described functions of mobile device 110. Memory 430 is generally operable to store computer executable code and data. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of mobile device 110 include additional components (beyond those shown in FIG. 4) responsible for providing certain aspects of the mobile device's functionality, including any of the functionality described above and/or any additional functionality (including any functionality necessary to support the solution described above).

Figure 5:
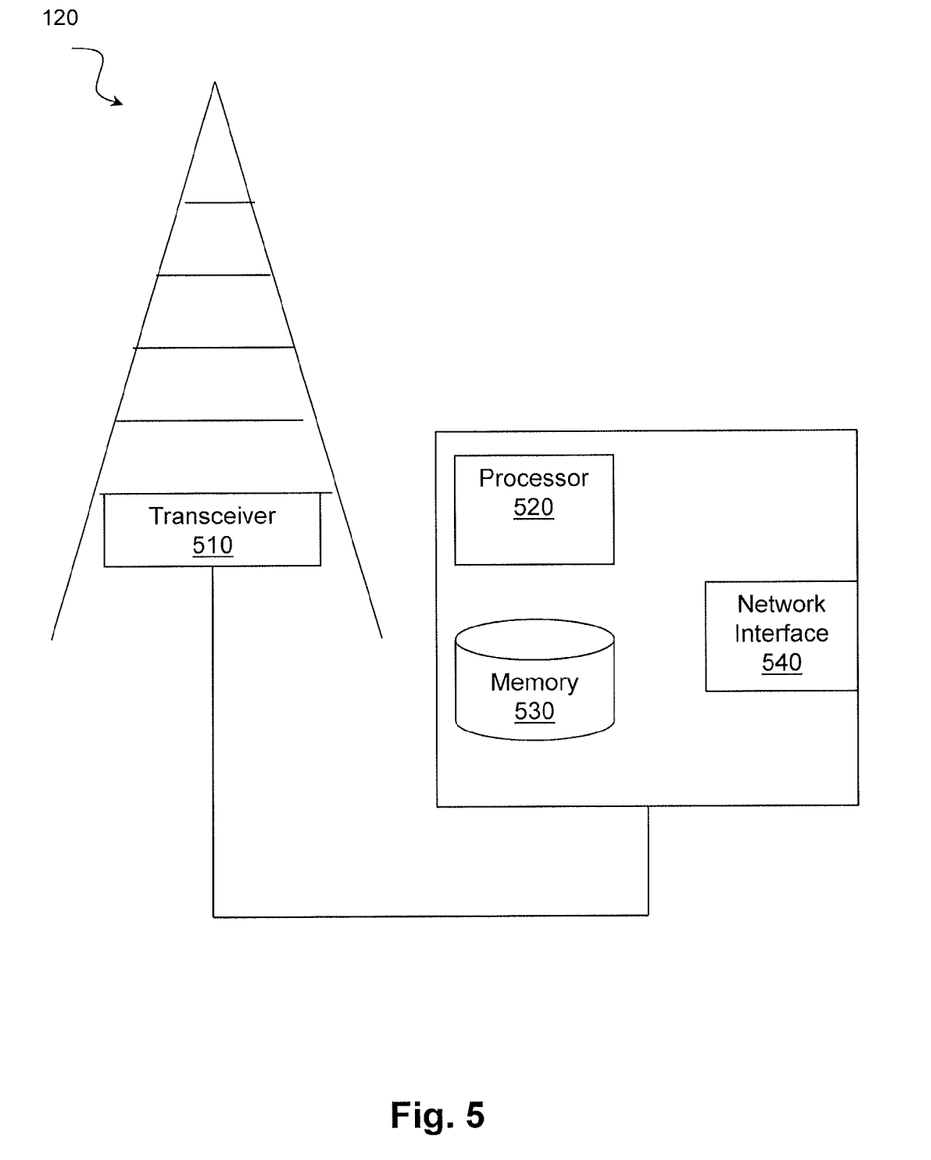
FIG. 5 illustrates a block diagram of a radio access node according to one embodiment of the present disclosure.

FIG. 5 illustrates a block schematic of a radio network node 120 according to one embodiment of the present disclosure. Radio network node 120 can be, for example, a radio access node, such as an eNodeB, a node B, a base station, a wireless access point (e.g., a Wi-Fi access point), a low power node, a base transceiver station (BTS), a transmission point or node, or a remote RF unit (RRU). Other network nodes, such as one or more radio network controllers, can be configured between the radio access nodes and core network nodes 130. Such other network nodes can include processors, memory, and interfaces similar to those described with respect to FIG. 5; such other network nodes, however, might not necessarily include a wireless interface, such as transceiver 510.

Radio network node 120 includes at least one processor 520, at least one memory 530, and at least one network interface 540; in certain embodiments, radio network node 120 can also include a transceiver 510. Transceiver 510 facilitates transmitting wireless signals to and receiving wireless signals from mobile device 110 (e.g., via an antenna); processor 520 executes instructions to provide some or all of the functionality described above as being provided by a radio network node 120; memory 530 stores the instructions executed by processor 520; and network interface 540 communicates signals to backend network components, such as a gateway, switch, router, Internet, Public Switched Telephone Network (PSTN), other radio access nodes 120, and/or core network nodes 130. The processor 520 and memory 530 can be of the same types as described supra with respect to FIG. 4.

In some embodiments, network interface 540 is communicatively coupled to processor 520 and refers to any suitable device operable to receive input for radio network node 120, send output from radio network node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

Other embodiments of radio network node 120 include additional components (beyond those shown in FIG. 5) responsible for providing certain aspects of the node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 6:
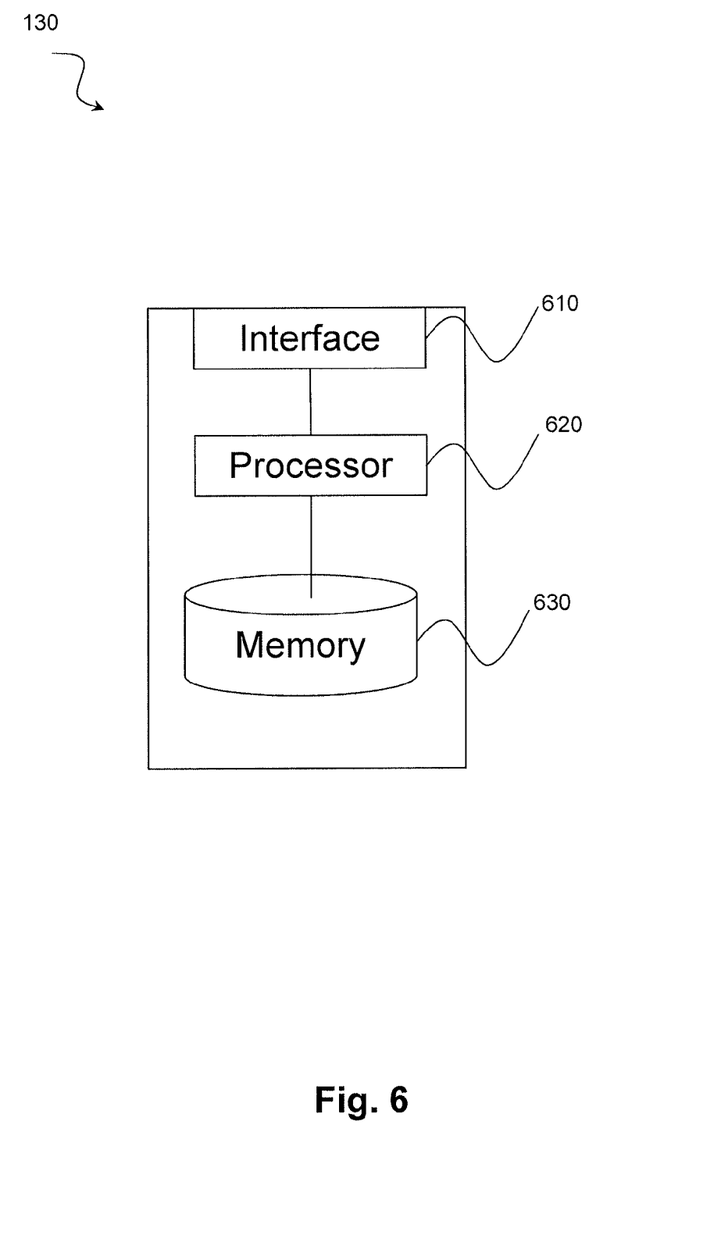
FIG. 6 illustrates a block diagram of a core network node according to one embodiment of the present disclosure.

FIG. 6 illustrates a block schematic of core network node 130 according to one embodiment of the present disclosure. Examples of a core network node 130 include, but are not limited to, a mobile switching center (MSC), a serving GPRS support node (SGSN), a mobility management entity (MME), a radio network controller (RNC), and a base station controller (BSC). Core network node 130 includes processor 620, memory 630, and network interface 640. Processor 620 executes instructions to provide some or all of the functionality described above as being provided by core network node 130; memory 630 stores the instructions executed by processor 620; and network interface 640 communicates signals to other network nodes. The processor 620 and memory 630 can be of the same types as described supra with respect to FIG. 4.

In some embodiments, network interface 640 is communicatively coupled to processor 620 and may refer to any suitable device operable to receive input for core network node 130, send output from core network node 130, perform suitable processing of the input or output or both, communicate to other devices, or any combination of the preceding. Network interface 640 includes appropriate hardware (e.g., port, modem, network interface card, etc.) and software, including protocol conversion and data processing capabilities, to communicate through a network. Other embodiments of core network node 130 include additional components (beyond those shown in FIG. 6) responsible for providing certain aspects of the core network node's functionality, including any of the functionality described above and/or any additional functionality (including any functionality necessary to support the solution described above).

Figure 7A:
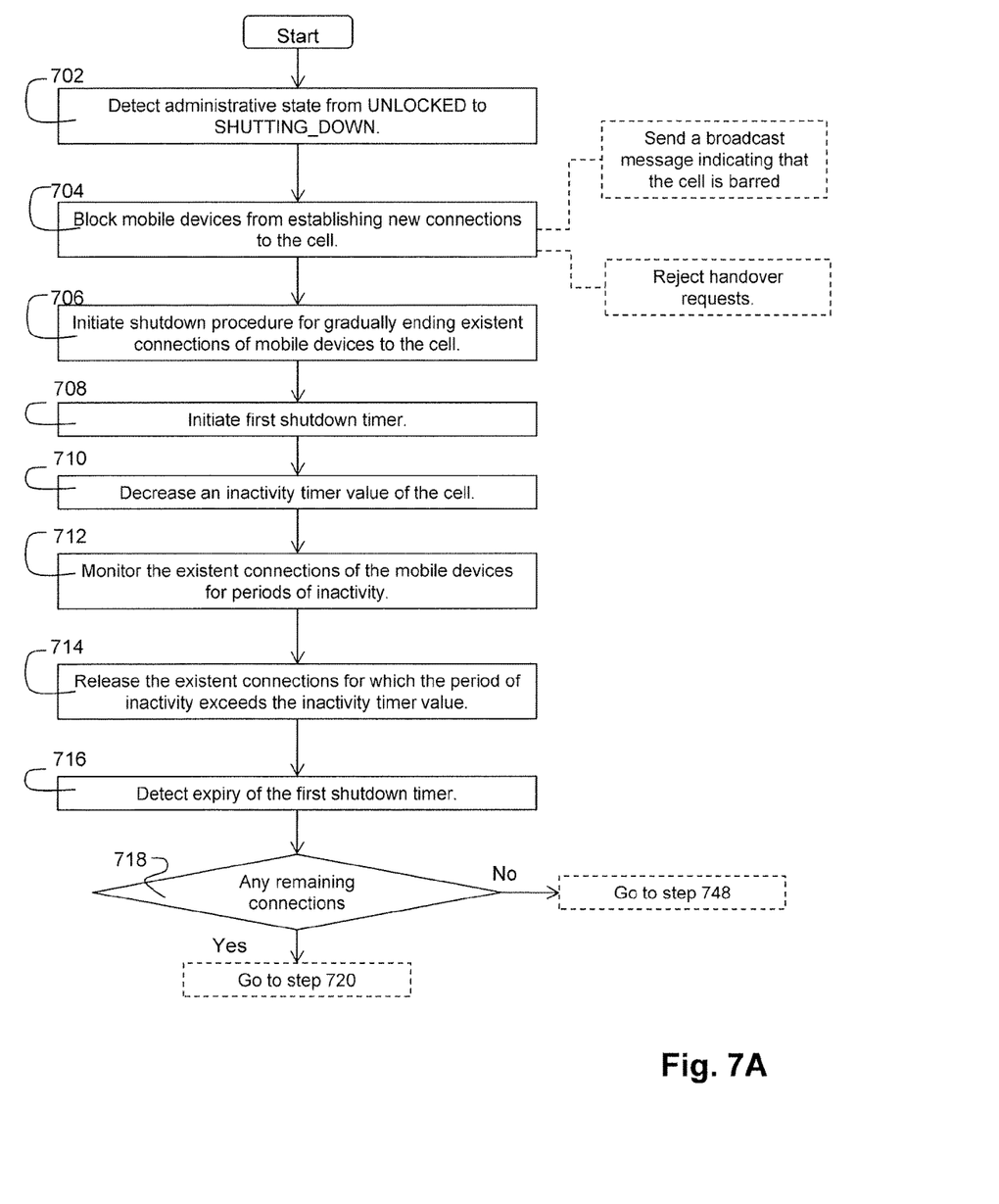
FIGS. 7A-7C show a flow diagram of a method for soft locking a cell that may be performed by a radio access node according to one embodiment of the present disclosure.
Figure 7B:
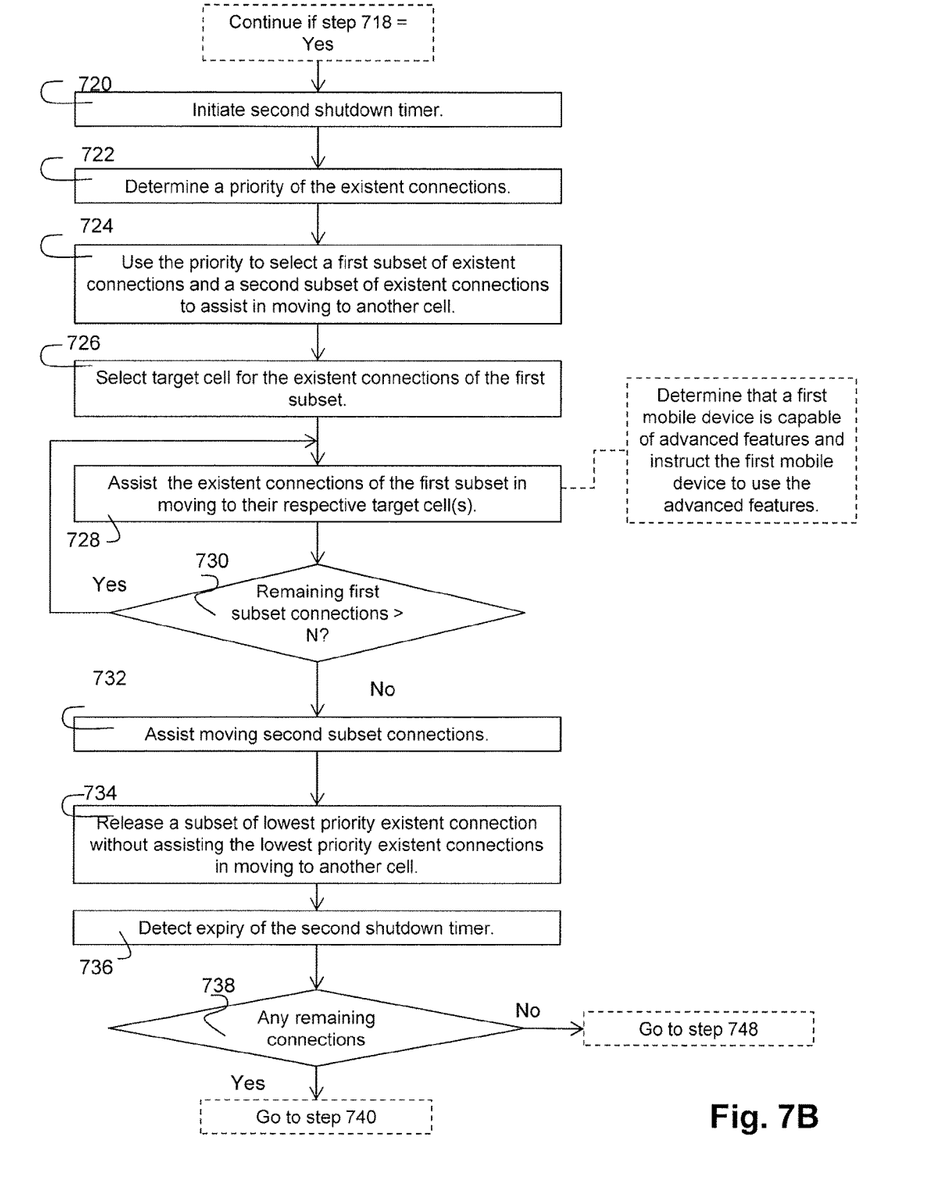
Figure 7C:
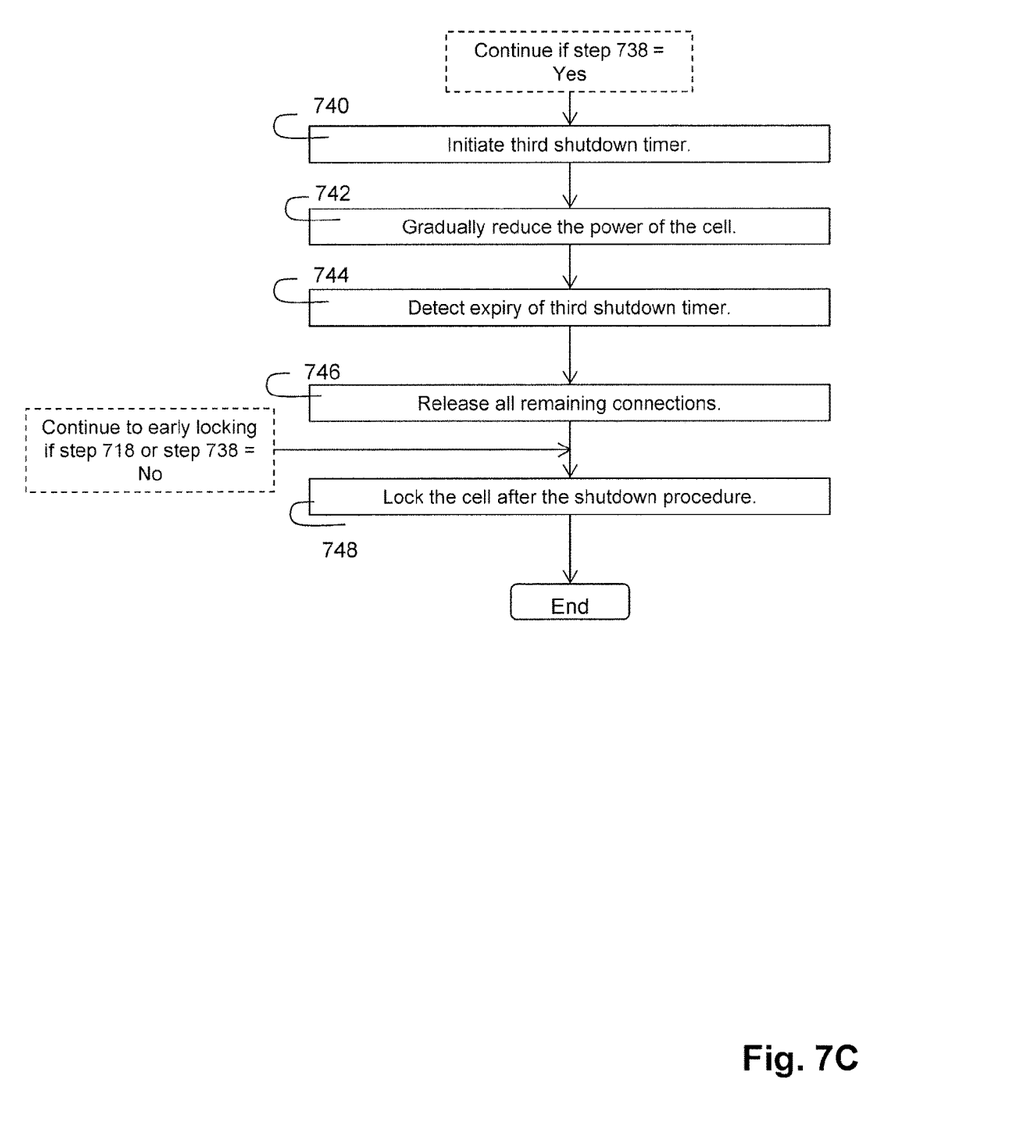

FIGS. 7A-7C show a flow diagram of a method for soft locking a cell that may be performed by a radio network node 120 according to one embodiment of the present disclosure. At step 702, radio network node 120 detects that an administrative state has changed from unlocked to shutting down. In some embodiments, a network operator initiates the change in administrative state. For example, the network operator may change the administrative state in order to repair, replace, upgrade, maintain, or decommission the hardware or software components associated with the cell. The change in administrative state may also be initiated automatically in response to any suitable criteria. As an example, to conserve energy, radio network node 120 may temporarily shut down a lightly loaded cell. As another example, radio network node 120 may shut down a cell in response to detecting a problem with the cell, such as a high rate of dropped calls.

At step 704, radio network node 120 blocks mobile devices from establishing new connections to the cell. Blocking the mobile devices reduces the number of connections to be moved from the cell because the it prevents the cell from accepting new connections that eventually would need to be moved out of the cell. Blocking the mobile devices also prevents released connections from reconnecting on the cell that is being shut down. To block the connections, radio network node 120 may send a broadcast message indicating that the cell is barred. For example, in an LTE network, radio network node 120 may configure system information block type 1 (SIB1) messages to indicate that the cell is barred from accepting incoming traffic. Radio network node 120 may also send rejections in response to receiving handover requests. The rejections indicate that the cell is barred from receiving handovers.

At step 706, radio network node 120 initiates a shutdown procedure for gradually ending existent connections of mobile devices to the cell. Pre-defined parameters configure any suitable criteria for shutting down the cell, such as any combination of one or more of the options and considerations described above with respect to FIG. 3. As an example, and as further described below, in some embodiments the pre-defined parameters configure a shutdown procedure that releases existent connections based on activity level, assists existent connections in moving to other cells based on priority level, releases low priority existent connections without assistance, and/or gradually reduces the power of the cell to encourage mobile devices to move to cells with better signals. In some embodiments, the pre-defined parameters include one or more timers configured to implement the shutdown procedure in multiple stages.

At step 708, radio network node 120 initiates a first shutdown timer. Prior to the expiry of a first shutdown timer, radio network node 120 ends existent connections based on the activity level. In some embodiments, radio network node 120 decreases the inactivity timer value associated with the cell at step 710. Decreasing the inactivity timer to its minimum value, for example, allows for ending connections as quickly as possible. At step 712, radio network node 120 monitors the existent connections of the mobile devices for periods of inactivity and at step 714 radio network node 120 releases the existent connections for which the period of inactivity exceeds the inactivity timer value.

Radio network node 120 detects expiry of the first shutdown timer at step 716. In response, radio network node 120 determines if any connections remain on the cell at step 718. If no connections remain, radio network node 120 skips to step 748 and locks the cell.

If any connections remain after the expiry of the first shutdown timer at step 716, radio network node 120 initiates a second shutdown timer at step 720 and begins to assist existent connections in moving from the current cell to a respective target cell at steps 722-732. In some embodiments, in addition to assisting the existent connections in moving from the current cell, radio network node 120 continues to release connections based on inactivity after the expiry of the first shutdown timer.

At step 722, radio network node 120 determines a priority for the existent connections. Any suitable criteria may be used to prioritize the existent connections, such as allocation retention priority (ARP) information, service type (e.g., voice services may receive higher priority than data services), subscription level information associated with the existent connections (e.g., a subscription to a higher QOS level may receive higher priority than a subscription to a lower QOS level).

At step 724, radio network node 120 uses the priority to group the existent connections into subsets. Any suitable number of subsets may be used. Examples include a first subset of existent connections (such as highest priority existent connections), a second subset of existent connections (such as second highest priority existent connections), . . . an Nth subset of existent connections (such as Nth highest priority existent connections), and a subset of lowest priority existent connections. One or more of the subsets may be selected to receive assistance in moving to another cell. For example, as further discussed below, radio network node 120 may select to assist moving the first subset of existent connections, the second subset of existent connections, . . . and the Nth subset of existent connections in batches based on priority.

At step 726, radio network node 120 selects one or more target cells for the first subset of existent connections. In some embodiments, radio network node 120 uses a load balancing procedure to select the target cells. The load balancing procedure distributes the existent connections among multiple cells by matching each existent connection to its respective target cell based on one or more of service used, application used, recent history of data volume used by the connection, channel quality, subscribed quality of service, power measurement, and current load on the target cell. As an example, suppose that a power measurement report indicates that mobile device 110a receives a good signal from both cell 125b and cell 125c. Also suppose that cell 125b is heavily loaded and that cell 125c is lightly loaded. Radio network node 120 may select to move mobile device 110a to cell 125c instead of cell 125b for load balancing purposes.

At step 728, radio network node 120 assists in moving existent connections of the first subset to their respective target cells. In some embodiments, radio network node 120 assists a connection in moving to its target cell by forcing a handover to the target cell. In some embodiments, radio network node 120 assists a connection in moving to its target cell by release with redirect to the target cell. In some embodiments, radio network node 120 further assists in moving a connection to its target cell by determining if the relevant mobile device is capable of one or more advanced features and, if yes, instructing the mobile device to use the advanced features when moving its existent connection to the respective target cell. Examples of advanced features include downlink coordinated multipoint operation, uplink coordinated multipoint operation, and carrier aggregation.

At step 730, radio network node 120 determines if the number of existent connections of the first subset remaining in the cell exceeds a threshold N number of connections. The threshold N may be set to any suitable value such as 0, 1, 2, and so on. In some embodiments, N may indicate a percentage of the highest priority connections relative to the other traffic on the cell. If the number of existent connections of the first subset remaining in the cell exceeds N, radio network node 120 returns to step 728 to continue moving only the existent connections of the first subset to the target cells.

Once the number of existent connections of the first subset remaining in the cell is less than N, radio network node 120 proceeds to step 732 and assists in moving the second subset of existent connections according to steps analogous to those used to move the first subset of existent connections (i.e., steps 726-730). Thus, in the preceding example, radio network node 120 waits to assist the second subset of existent connections in moving to their respective target cells until most or all of the first subset of existent connections have already been moved out of the cell. In some embodiments, radio network node 120 may repeat a similar process for any suitable number of subsets. For example, after moving some or all of the second subset of existent connections, radio network node 120 may begin moving a third subset of existent connections and so on.

At step 732, radio network node 120 optionally releases a subset of lowest priority existent connections without assisting the lowest priority existent connections in moving to another cell.

Radio network node 120 detects expiry of the second shutdown timer at step 736. In response, radio network node 120 determines if any connections remain on the cell at step 738. If no connections remain, radio network node 120 skips to step 748 and locks the cell.

If any connections remain after the expiry of the second shutdown timer at step 736, radio network node 120 proceeds to step 740 and initiates a third shutdown timer. At step 742, radio network node 120 gradually reduces the power of the cell. Reducing the power encourages remaining existent connections to move to other cells with better power. In addition to reducing the power, in some embodiments radio network node 120 continues to release connections based on inactivity and to assist in moving connections out of the cell.

At step 744, radio network node 120 detects the expiry of the third shutdown timer. The expiry of the third shutdown timer indicates that the maximum period for the graceful shutdown has elapsed. In response, radio network node 120 releases all remaining connection at step 746 and locks the cell at step 748. Thus, the cell is locked in response to detecting the end of the shutdown procedure. The end of the shutdown procedure may be detected if all of the existent connections of the mobile devices to the cell have ended (e.g., early-locking of the cell may be performed prior to the end of a shutdown time period if all of the existent connections have ended). The end of the shutdown period may also be detected upon the expiry of a maximum shutdown period timer.

Modifications, additions, or omissions also may be made to the method of FIGS. 7A-7C without departing from the scope of the disclosure. The method may include more, fewer, or other steps, for example, depending on the combination of shutdown options configured for a particular embodiment, such as any one or more of Options 1-7 described with respect to FIG. 3. Thus, in FIGS. 7A-7C, depending on the embodiment, one or more of (a) releasing connections based on inactivity (e.g., steps 710-714), (b) prioritizing the connections (e.g., steps 722-724), (c) assisting in moving connections to another cell (e.g., steps 726-732), (d) releasing a subset of lowest priority connections (e.g., step 734), and (e) gradually reducing the power of the cell (e.g., step 742) may be optional. Additionally, steps may be performed in any suitable order, and certain steps may be performed either sequentially or in parallel. The number of shutdown timers and the conditions that trigger the shutdown timers may be configured to facilitate performing the steps in an order appropriate for the particular embodiment. Although FIGS. 7A-7C describe three shutdown timers, other embodiments may use more or fewer shutdown timers. As an example, in an embodiment that omits the gradual power reduction step 742 of FIGS. 7A-7C, the third shutdown timer may not be needed and steps 740 and 744 may also be omitted.

Some embodiments of the disclosure may provide one or more technical advantages. One technical advantage is that certain embodiments offer a number of design options and considerations for gracefully releasing existing traffic. The number of design options may allow for optimizing the soft lock method based on the topography of the network, the current load on the system, or other factors. As an example, in some embodiments, the selected design options may include using a two-step approach to soft lock the cell. In the first step, the radio access node blocks incoming traffic. In the second step, the radio access node gradually ends/moves existent connections between the cell and mobile devices. The soft locking method allows for coordination with neighboring cells to gracefully shut down the cell. Thus, service impacts associated with locking a cell may be reduced or eliminated.

A technical advantage of certain embodiments uses connection supervision on mobile device session inactivity to trigger the release of mobile device sessions. The use of session inactivity is relatively simple and inexpensive to implement, and it is effective enough to end most of the data-only traffic sessions on the cell with minimal traffic disturbance. A technical advantage of certain embodiments actively triggers handover or release with redirect (RWR) to assist with moving the active sessions from the current cell to a neighboring cell. A technical advantage of certain embodiments uses a number of shutdown timers to coordinate when to the use each of the various techniques for ending the sessions on the current cell. For example, a session inactivity technique can be used for a period of time prior to using handover or RWR techniques.

Some embodiments may benefit from some, none, or all of the advantages. Other technical advantages may be readily ascertained by one of ordinary skill in the art.

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the disclosure. The methods may include more, fewer, or other steps. Additionally, steps may be performed in any suitable order, and certain steps may be performed either sequentially or in parallel.

Although this disclosure has been described in terms of certain embodiments, alterations and permutations of the embodiments will be apparent to those skilled in the art. As an example, although certain examples have been described in the context of long term evolution (LTE), other embodiments may use LTE-Advanced, UMTS, HSPA, GSM, cdma2000, WiMax, WiFi, and/or other suitable radio access technology or combination of radio access technologies.

The above description of the embodiments does not constrain this disclosure. Other changes, substitutions, and alterations are possible without departing from the spirit and scope of this disclosure, as defined by the following claims.

The invention claimed is:

1. A method of locking a cell of a wireless network, the method comprising:
blocking mobile devices from establishing new connections to the cell;
ending existent connections of mobile devices to the cell gradually based on a shutdown procedure, the shutdown procedure configured according to pre-defined parameters, wherein the predefined parameters indicate to end the existent connections based on at least one of: a priority level of existent connections or an activity level of existent connections; and
locking the cell after the shutdown procedure;
wherein the shutdown procedure comprises:
determining the priority level of existent connections;
using the priority level to select a first subset of existent connections to receive assistance in moving to another cell;
selecting a target cell for a first existent connection of the first subset of existent connections;
assisting in moving the first existent connection to the selected target cell;
using the priority level to select a second subset of existent connections to receive assistance in moving to another cell;
determining if greater than a threshold number of the first subset of existent connections remain in the cell;
if greater than the threshold number of the first subset of existent connections remain in the cell, waiting to assist in moving the second subset of existent connections; and
if fewer than the threshold number of the first subset of existent connections remain in the cell, assisting in moving the second subset of existent connections.

2. The method of claim 1, the shutdown procedure further comprising releasing a subset of lowest priority level existent connections without assisting the lowest priority level existent connections in moving to another cell.

3. The method of claim 1, wherein the method determines priority level based on allocation retention priority information.

4. The method of claim 1, wherein the method determines priority level based on service type and voice services receive higher priority than data services.

5. The method of claim 1, wherein the method determines priority level based on subscription level information associated with the existent connections.

6. The method of claim 1, wherein assisting the first existent connection in moving to the selected target cell comprises forced handover of the first existent connection.

7. The method of claim 1, wherein assisting the first existent connection in moving to the selected target cell comprises release with redirect of the first existent connection.

8. The method of claim 1, wherein the shutdown procedure comprises assisting in moving at least some of the existent connections according to a load balancing procedure, wherein the load balancing procedure matches each such existent connection to a respective one or more of a plurality of target cells based on at least one of service used, application used, and recent history of data volume used by the connection.

9. The method of claim 1, wherein the shutdown procedure comprises assisting in moving at least some of the existent connections according to a load balancing procedure, wherein the load balancing procedure matches each such existent connection to a respective one or more of a plurality of target cells based on at least one of channel quality, subscribed quality of service, power measurement, and current load on the target cells.

10. The method of claim 1, wherein the pre-defined parameters include timers configured to implement the shutdown procedure in multiple stages.

11. The method of claim 1, wherein ending the existent connections of mobile devices to the cell further comprises:
decreasing an inactivity timer value associated with the cell;
monitoring the existent connections of the mobile devices for periods of inactivity; and
releasing the existent connections for which the period of inactivity exceeds the inactivity timer value.

12. The method of claim 11, wherein:
prior to the expiry of a first shutdown timer, the method ends the existent connections based on the periods of inactivity; and
after the expiry of the first shutdown timer, the method begins assisting moving the existent connections to one or more target cells.

13. The method of claim 1, the shutdown procedure further comprising:
determining that a first mobile device is capable of downlink coordinated multipoint operation, uplink coordinated multipoint operation, or carrier aggregation; and
instructing the first mobile device to use one or more of the downlink coordinated multipoint operation, the uplink coordinated multipoint operation, and the carrier aggregation when moving the first mobile device's existent connection to the selected target cell.

14. The method of claim 1, further comprising:
early-locking the cell in response to a determination that all of the existent connections of the mobile devices to the cell ended prior to the end of a shutdown time period.

15. The method of claim 1, further comprising:
detecting the expiry of a maximum shutdown period timer and, in response, releasing all remaining existent connections.

16. The method of claim 1, wherein the shutdown procedure further comprises gradually reducing power of the cell.

17. The method of claim 1, wherein blocking the mobile devices from establishing the new connections to the cell further comprises sending a broadcast message indicating that the cell is barred.

18. The method of claim 1, wherein blocking the mobile devices from establishing the new connections to the cell further comprises:
receiving a handover request;
sending a rejection in response to the handover request, the rejection indicating that the cell is barred.

19. A network node comprising one or more processors and memory, the memory containing instructions executable by the one or more processors, whereby the network node is operable to:
block mobile devices from establishing new connections to a cell of the network node;
end existent connections of mobile devices to the cell gradually based on a shutdown procedure, the shutdown procedure configured according to pre-defined parameters, wherein the predefined parameters indicate to end the existent connections based on at least one of: a priority level of existent connections or an activity level of existent connections; and
lock the cell after the shutdown procedure;
wherein the shutdown procedure is operable to:
determine the priority level of existent connections;
use the priority level to select a first subset of existent connections to receive assistance in moving to another cell;
select a target cell for a first existent connection of the first subset of existent connections; assist in moving the first existent connection to the selected target cell;
use the priority level to select a second subset of existent connections to receive assistance in moving to another cell;
determine if greater than a threshold number of the first subset of existent connections remain in the cell;
if greater than the threshold number of the first subset of existent connections remain in the cell, wait to assist in moving the second subset of existent connections; and
if fewer than the threshold number of the first subset of existent connections remain in the cell, assist in moving the second subset of existent connections.

20. The network node of claim 19, wherein the shutdown procedure is operable to determine the priority level based on at least one of allocation retention priority information, service type, and subscription level information associated with the existent connections.

21. The network node of claim 19, wherein to end the existent connections of mobile devices to the cell the network node is further operable to:
decrease an inactivity timer value associated with the cell;
monitor the existent connections of the mobile devices for periods of inactivity; and
release the existent connections for which the period of inactivity exceeds the inactivity timer value.

22. The network node of claim 21, wherein:
prior to the expiry of a first shutdown timer, the network node is operable to end the existent connections based on the periods of inactivity; and
after the expiry of the first shutdown timer, the network node begins assisting moving the existent connections to one or more target cells.

* * * * *